United States Patent [19]
Wellings et al.

[11] Patent Number: 5,106,439
[45] Date of Patent: Apr. 21, 1992

[54] APPLICATION OF COVERINGS TO SURFACES

[75] Inventors: Kenneth J. Wellings; William B. Allonby, both of Cumbria, United Kingdom

[73] Assignee: Vickers Shipbuilding & Engineering Limited, Cumbria, United Kingdom

[21] Appl. No.: 466,907

[22] Filed: Jan. 18, 1990

[51] Int. Cl.$^5$ ............... B32B 31/00; B65C 9/00; E04B 2/00; G05G 15/00
[52] U.S. Cl. ............... 156/71; 156/350; 156/572; 156/581; 156/582; 156/382
[58] Field of Search ............ 156/71, 228, 285, 581, 156/583.1, 569, 556, 572, 582, 443, 212, 215, 475

[56] References Cited

U.S. PATENT DOCUMENTS

| | | | |
|---|---|---|---|
| 2,578,329 | 12/1951 | Von Hofe | 156/443 X |
| 4,035,223 | 7/1977 | Russell | 156/443 |
| 4,084,306 | 4/1978 | Barker . | |
| 4,236,954 | 12/1980 | Edwards | 156/572 X |
| 4,259,128 | 3/1981 | Jannich et al. | 156/475 X |
| 4,682,926 | 7/1987 | Chambers et al. . | |

FOREIGN PATENT DOCUMENTS

| | | |
|---|---|---|
| 2933890 | 4/1981 | Fed. Rep. of Germany . |
| 3411882 | 10/1985 | Fed. Rep. of Germany . |
| 694764 | 7/1953 | United Kingdom . |

*Primary Examiner*—David A. Simmons
*Assistant Examiner*—Jeffrey G. Payne
*Attorney, Agent, or Firm*—Pollock, VandeSande & Priddy

[57] ABSTRACT

Coverings are applied to a surface by means of a member capable of temporarily holding the covering and urging it against the surface with adhesive interposed between the covering and the surface. The covering may be held by the member by means of suction and be urged against the surface by air pressure. The member may be mounted on a first articulated arm whose movement can be controlled by an operator who may be situated on a working platform mounted on a second articulated arm. The covering may be an acoustic tile for application to the surface of a submarine hull.

12 Claims, 6 Drawing Sheets

APPLICATION OF COVERINGS TO SURFACES

This invention relates to the application of coverings to surfaces and more particularly, but not exclusively, is concerned with applying coverings to surfaces which are curved for example as in the case where acoustic tiling is fitted to the external surfaces of submarines.

BACKGROUND OF THE INVENTION

There are many instances where a covering is applied to a surface and secured in position with an adhesive. Examples of such coverings are insulating and fire retardant sheet materials. The adhesives most commonly used tend to be of the epoxy resin type and require a significant time to cure, during which time gentle pressure should be maintained via the covering onto the surface. The problems of maintaining this gentle pressure increase when the surface is curved.

The external surfaces of submarines are often covered with acoustic tiles. These have three functions. Firstly they minimize the emission of radiated noise; secondly they reduce the transmission of noise along the metal of the hull; and thirdly they reduce the noise reflection caused by active sonar. As the pressure hulls are generally cylindrical with spherical ends, there is a need to bend the thick tiles to the curvature of the hull and to hold them in this position until the adhesive has cured.

SUMMARY OF THE INVENTION

According to one aspect of the invention, there is provided an apparatus for applying a covering to a surface, said apparatus comprising:

(i) a member having a surface essentially of the same profile and curvature as said surface to be covered;

(ii) means to locate said covering adjacent to said surface of said member, prior to application of said covering to said surface to be covered;

(iii) means to locate said member so that said covering, while adjacent to said surface of said member, is located against the surface to be covered with an adhesive interposed between the covering and the surface to be covered;

(iv) means to apply an essentially uniform pressure from said member, via said covering, onto said surface to be covered for a period of time long enough for said covering to become permanently bonded to said surface to be covered by means of said adhesive.

The adhesive may be applied to the covering, to the surface to be covered, or to both.

Preferably the means to locate the covering adjacent to the surface of the member is at least one partial vacuum applying means provided in the member and arranged to hold the covering fast to the member by suction. Advantageously, the locating means is also capable of picking up the covering from, for example, a supply of such coverings. Also, the means to apply an essentially uniform pressure is preferably air pressure acting through inflatable bags provided in the member. The means to secure removably the member to the surface to be covered may be a plurality of screwed devices or clips, etc. The profile and curvature of the adjacent surface of the member may also be adjustable to match a range of surface geometries.

According to an embodiment of the invention the apparatus for applying the covering additionally includes a means to handle the member comprising:

(i) a manipulator capable of removable connection to said member and provided with sufficient degrees of freedom and motive power to move said member through the appropriate angles and distances;

(ii) means of controlling the movement of said manipulator to position it accurately at a plurality of separate locations;

(iii) means of supplying any services, required on said member, to said member; and (iv) means to enable at least one operator to interface with said member to perform such operations as require human intervention.

A part or the whole of the surface may be covered in accordance with the invention and, in the case where large areas of the surface are to be covered, the member will of necessity be heavy so that power-assisted means of handling will be required. Thus an accurately-controllable manipulator will be advantageous. Similarly, where operator intervention is required, e.g. for accurate positioning of the member against said surface, it is preferable that the operator be locatable in the/each optimum location to perform the requisite intervention(s) and also that the manipulator be controlled by the operator at the/each location.

According to a further embodiment of the invention, the means to move said member and a means to move said operator in order for him/her to interface with said member at more than one location are located in juxtaposition. Ideally controls to move both the member and an operator's working platform are situated on said operator's working platform. Conveniently, hydraulic power is the means by which both the member and the operator's platform are movable.

According to a further aspect of the invention, there is provided a method of applying a covering to a surface, said method comprising:

(a) collecting the whole, or a part, of said covering from an adjacent location;

(b) placing said covering adjacent to the surface to be covered using a movable member to support and position accurately said covering;

(c) temporarily attaching said member to, or in relation to, said surface to be covered;

(d) exerting a force on said covering via said member so as to urge the covering against said surface to be covered with adhesive interposed between the covering and the surface to be covered; and (e) subsequently removing said member for further use.

Ordinarily, it will be necessary to prepare the surface to be covered and also the surface of the covering which is to be in direct contact with the surface to be covered.

Preferably the collection of the covering is via vacuum pads provided on the movable member which may subsequently present the underside of the covering for preparation, prior to attachment, e.g. for the application of adhesive or for the removal of a paper backing to expose the previously prepared surface. Surface preparation may also include mechanical or chemical treatment, painting, etc. of the surface to be covered as well as the application of adhesive, etc. The placing of the member adjacent to the surface to be covered is preferably effected via a manipulator supporting the member. The temporary attachment of the member to the surface may be via screwed means or clips, etc. The force maintained from the member, via the covering, onto the surface is preferably derived from compressed air acting via inflatable bags.

In particular application of the invention, the surface to be covered is a submarine hull and the covering is acoustic tiling. In this case, because of the size of the hull and the consequent weight of the members, powerful manipulators and means to provide access from the floor of the building area/slipway are required. Ideally, such manipulator and means of access are controlled hydraulically.

BRIEF DESCRIPTION OF THE DRAWINGS

For a clearer understanding of the invention and to show how it may be carried into effect, reference will now be made, by way of example, to the accompanying drawings, in which.

detailed description of the drawings in the following description, the tiling of a submarine hull is given as an example of the utility of the invention but it will be understood that this is only one of many applications of the invention. "Tiling" is the accepted term for the acoustic covering used on the external surfaces of submarines because it was first applied in the form of small square tiles. The term "tiling" is still accepted, even though the tiles may now be in the form of long strips, large rectangular areas or other irregular shapes specially cut to fit at given locations.

In the drawings, like parts are denoted by the same reference numerals.

Figure 1:
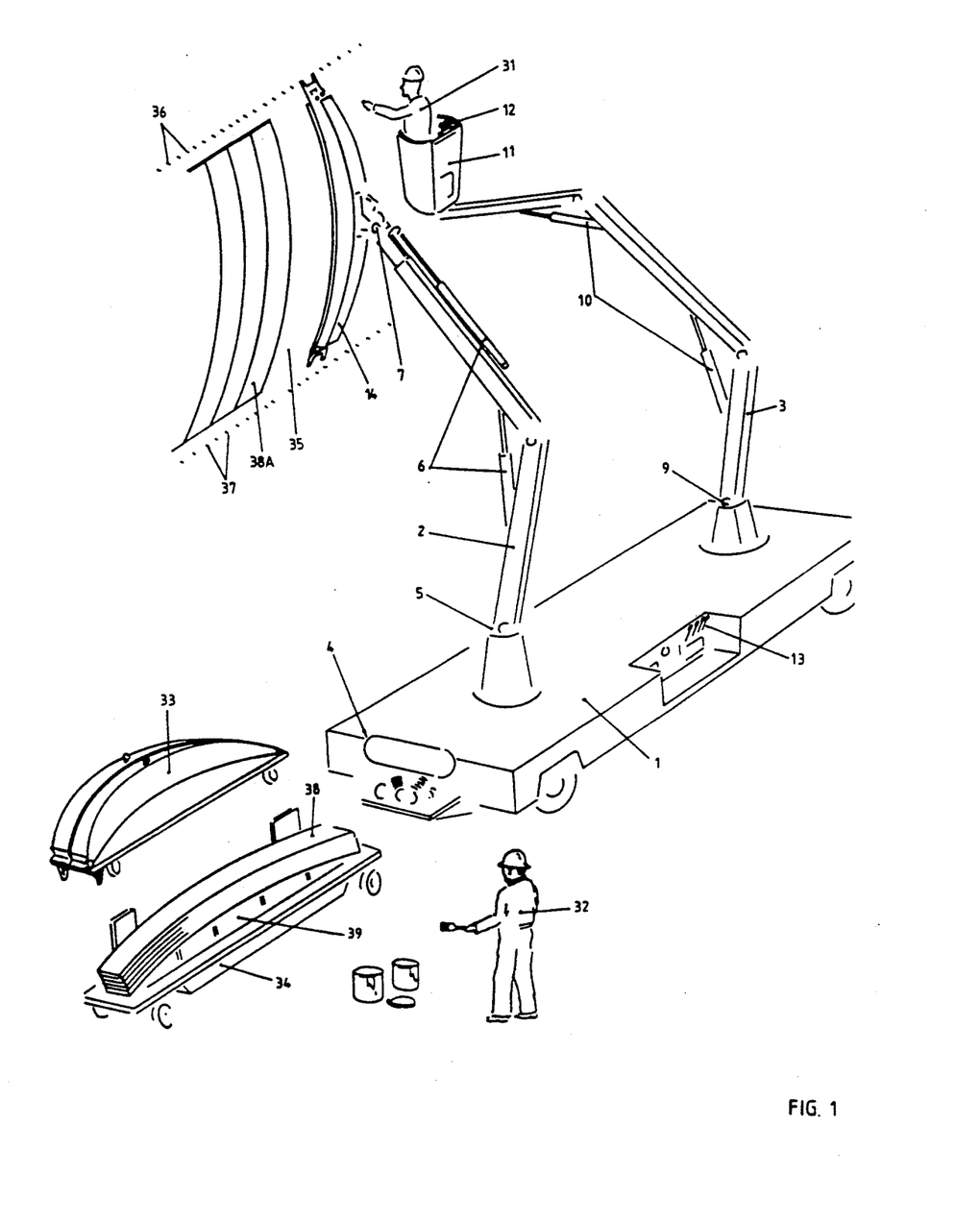
FIG. 1 shows pictorially an apparatus in accordance with the invention for fitting tiling strips to the pressure hull of a submarine.

Referring now to FIG. 1, there is shown a tiling vehicle 1 including a deck for supporting first and second hydraulically operated articulated arms 2,3. The vehicle 1 is also provided with a hydraulic power pack (not shown), to provide pressurized fluid to operate arms 2,3, and an air compressor 4. The prime mover, supplying power to operate compressor 4 and the hydraulic power pack, may be either a diesel engine or one or more electric motors provided with a separate power supply via a cable. In either case, the prime mover (like the hydraulic power pack) is mounted under the deck of the tiling vehicle and is thus not visible in FIG. 1. The prime mover may also be used to supply motive power to maneuver the tiling vehicle into position, if required.

Figure 3:
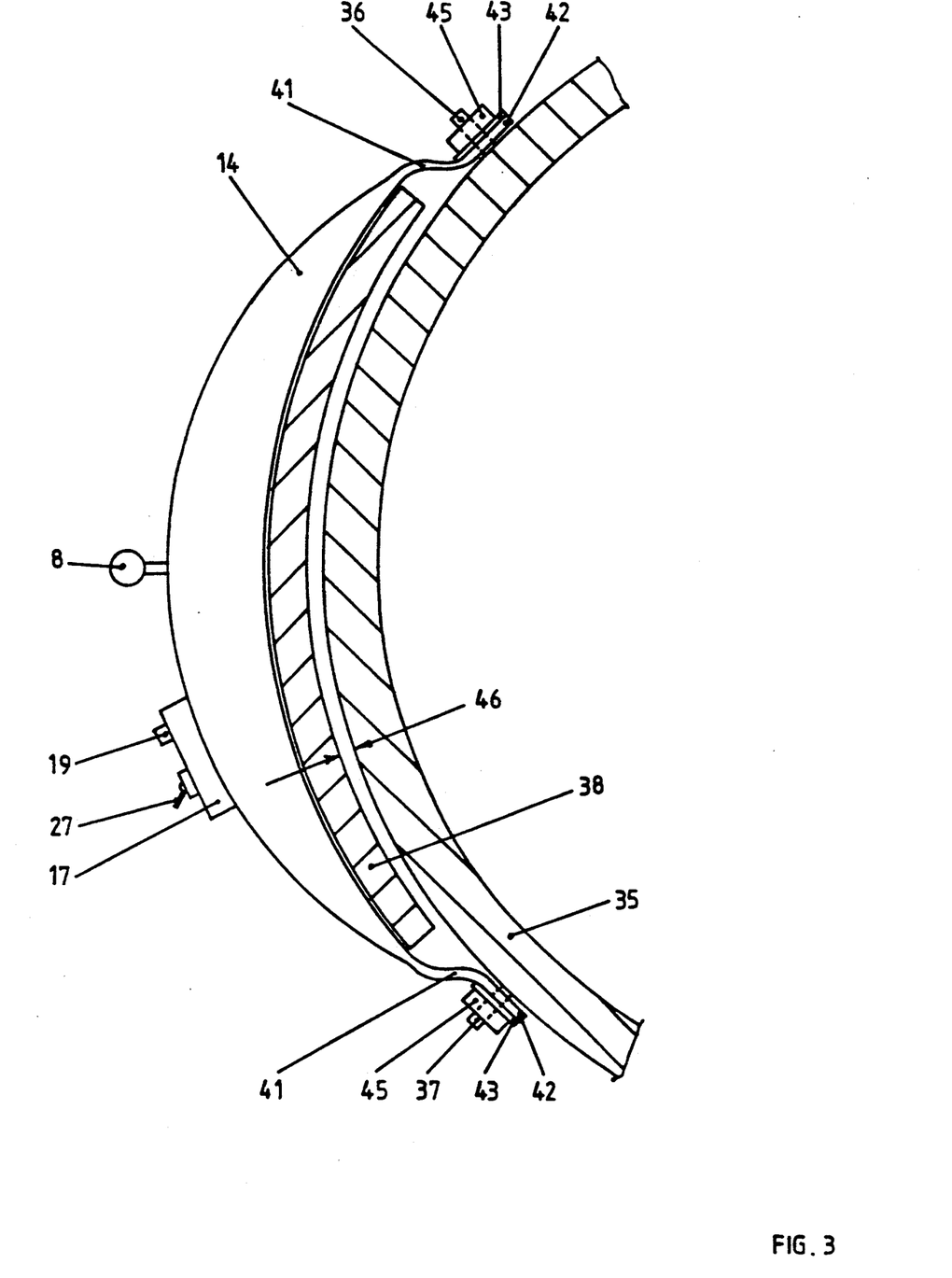
FIG. 3 shows an elevation through the member of FIGS. 1 and 2 when attached to the submarine hull.

The first hydraulic arm 2 includes a mounting 5 whereby it is pivotally and rotationally mounted on the vehicle 1. It also includes a telescopic section 2a. Pivotal and rotational movement of the arm 2 is effected hydraulically via the hydraulic power pack. The arm 2 is provided with double acting hydraulic rams 6 linked to the power pack to articulate and telescope the arm 2 and operate a manipulator 7 at its free end. The manipulator 7 includes a fixing means in the form of a ball joint socket (not shown), for removably connecting to a ball joint 8 (FIG. 3). A means (not shown) is provided to rotate the manipulator so that strongback 14 can be accurately aligned with the hull 35.

The second hydraulic arm 3 is pivotally and rotationally mounted on the vehicle 1 by mounting 9. Pivotal and rotational movement of the arm 3 are effected hydraulically via the hydraulic power pack. The arm 3 is articulated and is provided with two double acting hydraulic rams 10 linked to the power pack to articulate the arm 3 and control the positioning of a working platform 11 at its free end. Dual controls 12 and 13, each operably connected to arms 2 and 3, are provided. Control 12 is located on working platform 11 and control 13 is located on vehicle 1 so that both arms 2 and 3 may be controlled from either platform 11 or the deck of vehicle 1.

Figure 2:
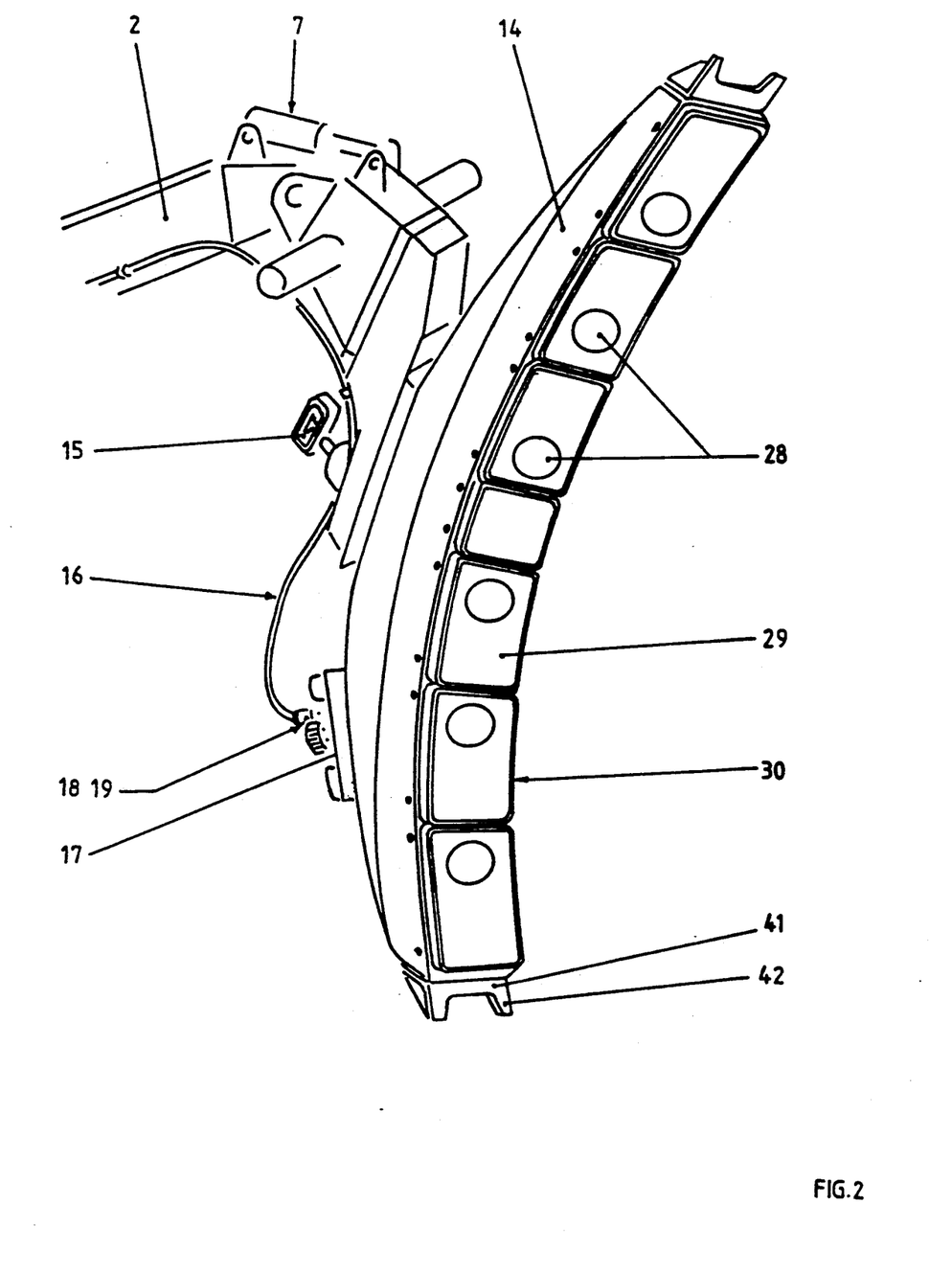
FIG. 2 shows diagrammatically the member and manipulator head of the apparatus of FIG. 1 on an increased scale.

FIG. 2 shows pictorially a member in the form of a "new moon" strongback 14. The term "new moon" is derived from the shape which is shown more clearly in the elevation of FIG. 3. Strongback 14 is removably attachable via ball joint 8 to the hall joint socket on manipulator 7 using a quick-release mechanism 15. The ball joint 8 permits strongback 14 to have limited freedom of movement relative to manipulator 7 even though manipulator 7 is provided with pivotal and rotational degrees of freedom controllable hydraulically by dual controls 12 and 13.

An air line 16 leads from the compressor 4, along the first hydraulic arm 2 to the strongback 14. The air line 16 terminates in a connector 18 which may be removably fitted into socket 19 on manifold 17 of the strongback to give an airtight joint. Connector 18 preferably includes an open/shut valve arranged so that mating of connector 18 and socket 19 automatically opens the valve for air flow and disconnection of connector 18 and socket 19 automatically shuts the valve.

Figure 5:
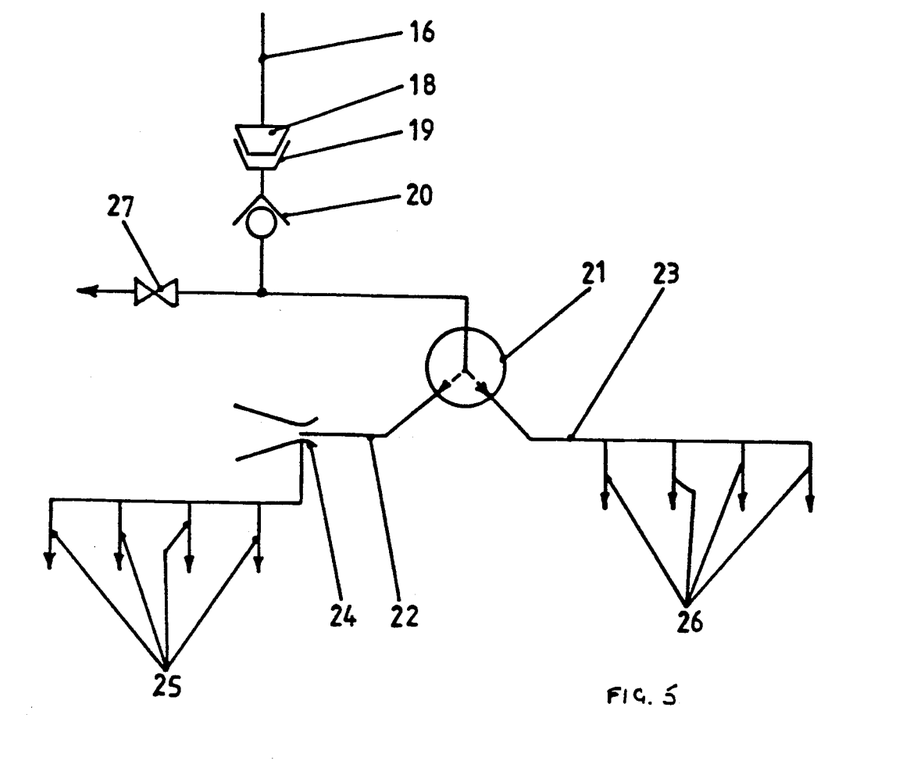
FIG. 5 is a flow diagram of the pipework for the manifold of the member of the apparatus of FIGS. 1 to 4.

As shown in FIG. 5, air from compressor 4 passes via air line 16, via connector 18, socket 19 and nonreturn valve 20 to two-way valve 21, whence it may be diverted either to pipe 22 or pipe 23. pipe 22 directs the air through vacuum ejector 24 thus inducing a partial vacuum in a plurality of vacuum pipes 25. Pipe 23 directs the air into a plurality of pressure pipes 26. Valve 27 enables the system to be vented to atmosphere.

Referring again to FIG. 2, the concave inner surface of the strongback 14 is fitted with a plurality of vacuum pads 28 and a plurality of pressure bags 29. The plurality of vacuum pipes 25 is connected to the plurality of vacuum pads 28 so that each pad 28 is connected to a pipe 25. Thus, when two-way valve 21 is connected to pipe 22, a partial vacuum is applied to every vacuum pad 28. Though a single vacuum ejector 24 has been shown in FIG. 5, a separate ejector could be provided for each individual vacuum pipe 25, if required. This would give a "fail-safe" system in the event of a malfunction of one vacuum pad 28. The plurality of pressure pipes 26 is connected to the plurality of pressure bags 29 so that each bag 29 is connected to a pipe 26. Thus, when two-way valve 21 is connected to pipe 23, each bag 29 is pressurized.

The combination of a vacuum pad 28 and a pressure bag 29 forms one of a number of "cells" 30 along the inner surface of the strongback 14. Though not visible, a plate is provided behind cells 30 to act as a reaction member. Thus cells 30 can act either in a suction mode or to exert pressure, depending on the position of two-way valve 21. Also, the suction or pressure modes may be alternated at will, simply by actuating the two-way valve 21. Because the membranes defining cells 30 will be placed under considerable stress due to pressure-vacuum cycling, the cells are designed to be readily replaceable. Also, a valve (not shown) may be incorporated in each pressure pipe 26 or vacuum pipe 25 to seal it in the event of catastrophic rupture.

The method of using the apparatus will now be described. Before the tiling operation is commenced, the submarine hull 35 is blasted clean and primed and two rows of screwed studs 36, 37 are welded in place on the hull, as shown in FIG. 1. After cleaning the weld areas, the tiling process may be commenced. Alternatively, to minimize the number of temporary connections made to the hull an intermediate structural member may be introduced between the hull and the strongback. This is connected to the hull by a small number of fastenings and carries the larger number of studs 36, 37 necessary to secure the strongbacks.

Using the controls 12, a first operator 31 (FIG. 1) pivots, rotates and/or lowers arm 2 to bring the ball joint socket of the manipulator 7 on to the ball joint 8 of a strongback 14 located on strongback pallet 33. A second operator 32 provides guidance and connects the ball joint 8 to the socket via the release mechanism 15 (FIG. 2). The first operator then raises the strongback 14 and moves it over the tiling pallet 34 where it is guided down onto the uppermost tiling strip 38. It will be noted that the tiling strips 38 are carried on a shaped support 39 so that they conform roughly to the curvature of the strongback 14 and the submarine hull 35. The second operator 32 then connects airline 16 via connector 18 to socket 19 and using the two-way valve 21, applies a partial vacuum via pipes 25 to pads 28 whereby the tiling strip 38 becomes affixed thereto.

Once the vacuum has been applied, the arm 2 is raised a short distance to lift the top tile strip 38 clear of the others. The first operator 31 then rotates the manipulator 7 through 90° by means of controls 12 so that the concave inner surface faces the second operator 32 standing in the position shown in FIG. 1.

The second operator 32 then prepares the underside of the tiling strip 38 for fixing to hull 35, e.g. by removing a protective covering and/or applying adhesive. Meanwhile, the first operator 31 applies adhesive to the submarine hull 35. The type of adhesive used generally comprises a resin and a hardener. Depending on the formulation, enough resin and hardener may be mixed to allow the fixing of a given number of strips 38, with the mixture being applied equally to both mating surfaces. Alternatively, the resin may be applied to one surface and the hardener to the other so that setting would not commence until the surfaces were in contact. The adhesive may be applied by either brush or spray.

When the adhesive has been applied, the first operator 31 moves arm 2 to the position shown in FIG. 1 via controls 12. From this position, he gently moves arm 2 to locate the tiling strip 38 correctly, i.e. adjacent to the strips 38A already fitted. Referring to FIG. 3, it will be noted that the ends 41 of the strongback 14 project beyond the arc of tiling strip 38 to leave a clearance 46 between the tiling strip 38 and hull 35. Thus strongback 14 can be maneuvered into position without the two adhesive covered surfaces coming into premature contact.

Figure 4:
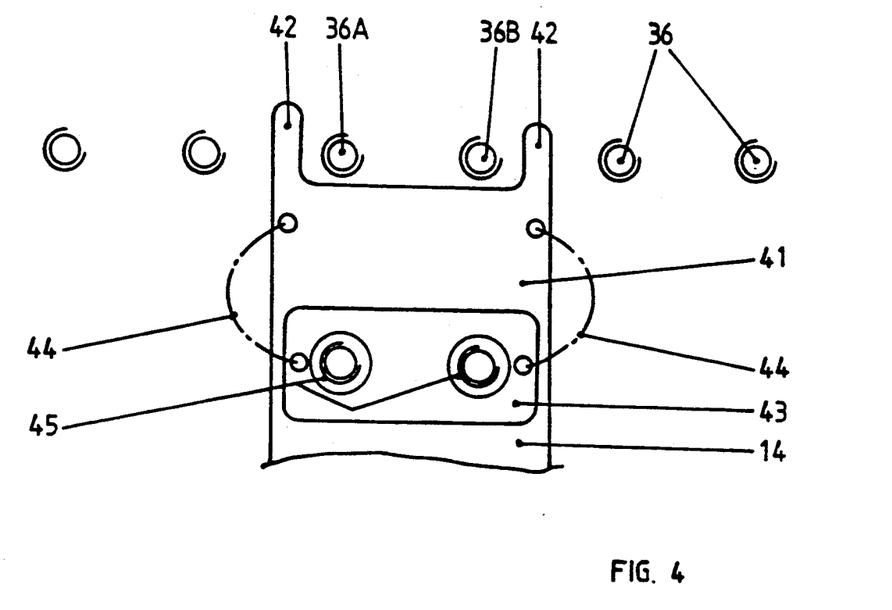
FIG. 4 shows schematically a part of the apparatus of FIGS. 1, 2 and 3 by which the member is secured to the submarine hull.

FIG. 4 shows how the ends 41 of the strongback 14 terminate in lugs 42 which fit around adjacent screwed studs 36A, 36B of the two rows of screwed studs 36, 37. Attached by flexible linkages 44 to each end 41 of each strongback 14 is a fixing plate 43 carrying two captive handnuts 45. When the strongback 14 has been correctly positioned, plate 43 is fixed over studs 36A, 36B and captive nuts 45 are screwed on until they are hand-tight. As this fixing is only to position strongbacks 14 positively, hand-tightness is sufficient.

When both ends of strongback 14 have been secured in this same way, the first operator 31 changes the control on the two-way valve 21 to the 'pressure' position, causing pressure bags 29 to inflate and advance tiling strip 38 into contact with pressure hull 35, i.e. eliminating the clearance 46 and forcing the two adhesive-covered surfaces into intimate contact. As the pressure in bags 29 builds up, tile strip 38 will adapt to the contours of hull 35, all air pockets will be squeezed out and the adhesive forced into all voids to provide the basis for a perfect bond.

The first operator 31 then disconnects the connector 18 of air line 16 from socket 19 (thus shutting off the air flow) and non-return valve 20 will maintain the air pressure in the bags 29. He can then disconnect ball joint 8 via release mechanism 15 and return the arm 2 to collect another strongback 14 from pallet 33 to repeat the process.

All the strongbacks 14 so fitted are left in position to maintain a positive pressure on the tiling strips 38 until the adhesive has cured. The timescale involved may vary from a few hours to a few days. When the adhesive has cured, the strongbacks 14 are removed in the following way. First, the first operator 31 would bring up arm 2 and connect manipulator 7 to ball joint 8 of a strongback 14 via mechanism 15. Then he releases vent valve 27 to allow the air in bags 29 to escape. He then unscrews hand nuts 45 and removes fixing plates 43 at both top and bottom and, via arm 2, returns strongback 14 to pallet 33 so that the integrity of the interchangeable cells 30 may be checked before further use.

Figure 6A:
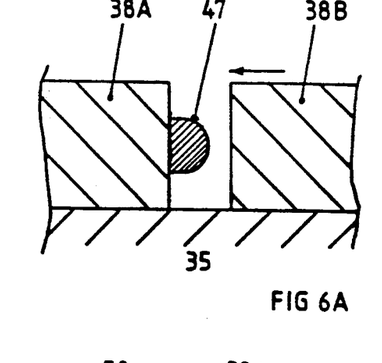
FIG. 6A shows a cross-section through adjacent tiles prior to the tiles being butted together.
Figure 6B:
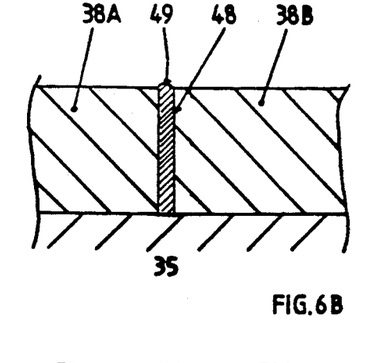
FIG. 6B shows a cross-section similar to that of FIG. 6A after the tiles have been butted together.

After several tiling strips 38 have been fitted, there may be gaps between adjacent strips to be filled. This can be done in one of three ways:

(i) A run of mastic may be applied to one tile strip before butting. As shown in FIG. 6A, a run of mastic 47 is applied to a fixed strip 38A and the next strip 38B is slid up towards it as indicated by the arrow until, as shown in FIG. 6B, the mastic 48 is deformed to fill the gap fully and excess 49 is squeezed out. The excess 49 may be removed with a mastic knife.

(ii) The gaps, may be filled with mastic, after the adhesive for the strips 38 has cured, using a conventional mastic gun.

Figure 7:
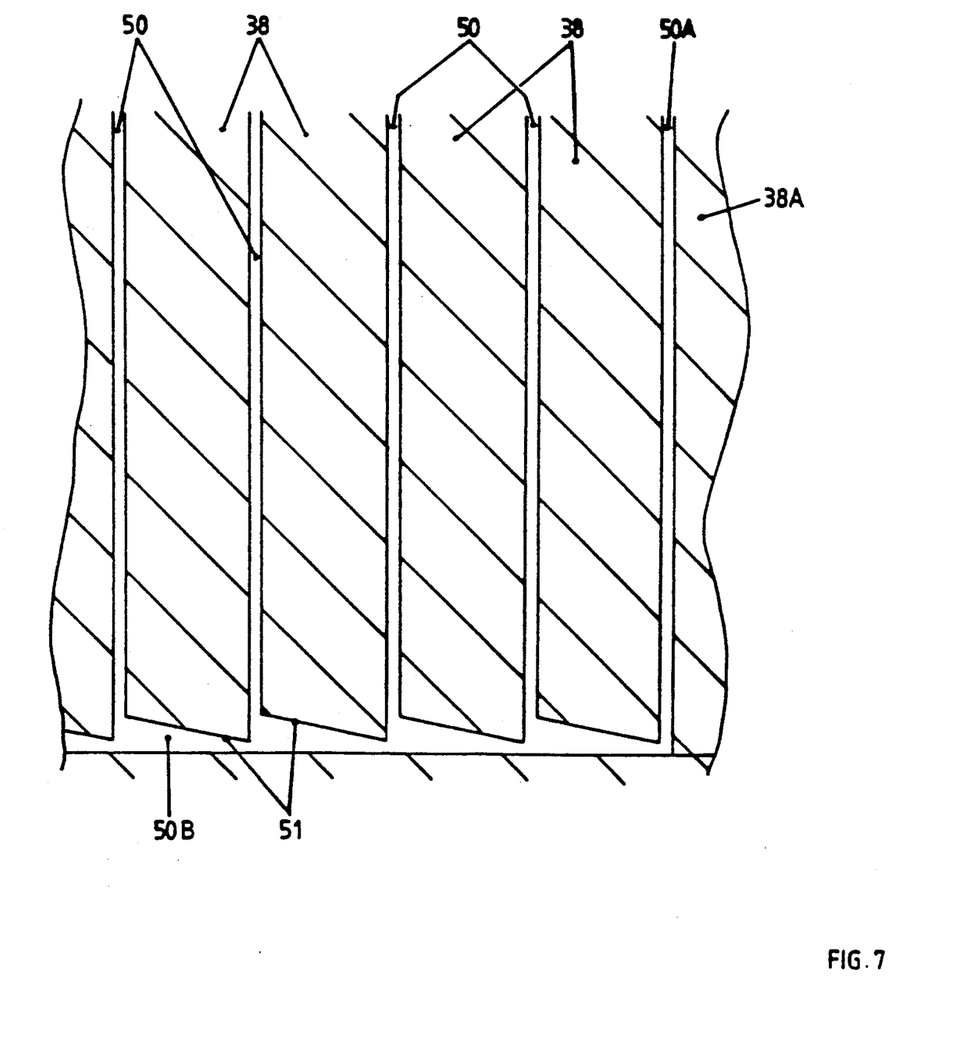
FIG. 7 is a plan view of the tiles shown in FIG. 6B.

(iii) The gaps 50 (FIG. 7) between the strips 38 can be covered with special adhesive tape and liquid tiling material (or resin) run down to fill up all gaps 50 at the sides and bottom. The lower ends 51 of the strips are cut at an angle so that, if liquid is run down gap 50A, it will flow leftwards and fill all other gaps without trapping any air bubbles. When the mastic has set, the adhesive tape can be peeled off. With this method, the strongbacks may be needed to supplement the adhesive strip to balance the hydrostatic pressure of the liquid tiling solution.

Though rectangular edged tiles 38A, 38B are shown for simplicity 'V' or angled joints are equally possible.

The two rows of screwed studs 36, 37 can be used again as part of the further tiling process. For example the lower row 37 can be used as an upper row when tiling the section below that shown in FIG. 1 and similarly, the upper row 36 can be used as a lower row when tiling the section above that shown in FIG. 1. However, after tiling right around the hull 35 by the method described, the areas around the rows of screwed studs 36 and 37 would not have been covered. In order to cover these areas, the following procedure may be used.

Starting from one end of a row of studs 36, 37, the end stud is left and a number next to it are removed but not the subsequent one. Thus there is obtained a strip of hull with a stud at each end. The strip of hull is cleaned, primed and prepared for tiling. As the strip runs in the axial direction along the cylindrical hull, it is essentially flat. Thus a different strongback with an essentially planar surface is used, in the manner described hereinbefore, to place the tiling strip onto the area whence the studs have been removed. The two studs left at the ends are used to secure the strongback. The air pressure in bags 29 will suffice to bend the tiling strip 38 to conform to the small curvature in the circumferential sense.

Figure 8:
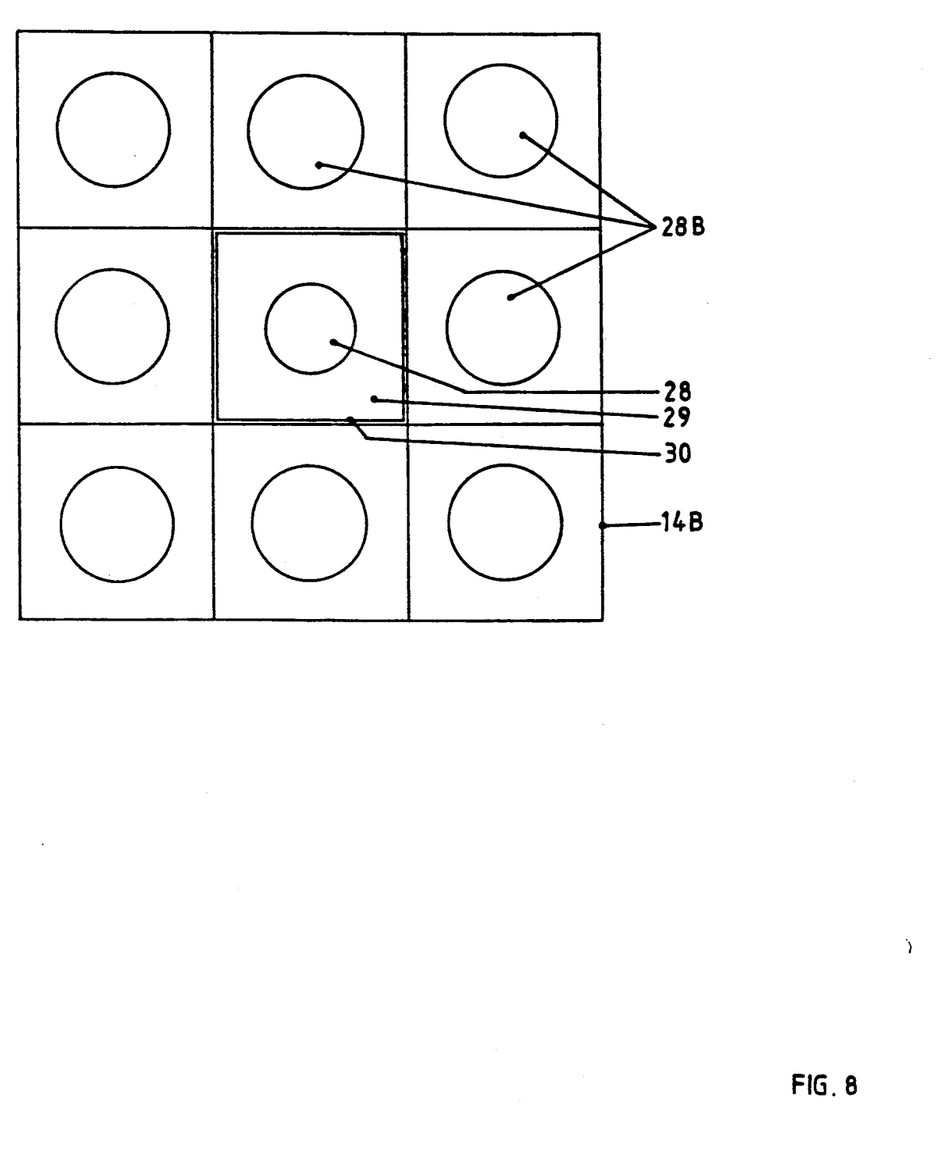
FIG. 8 shows a plan view of another form of member forming a part of an apparatus of the invention.

This procedure may be repeated along the hull, but will still leave small roughly square areas around the single end studs. To complete the tiling, a strongback 14B such as shown in FIG. 8 may be used. Strongback 14B is curved to conform with the hull radius. The underside consists of, for example, nine squares. The eight squares around the edge consist of large vacuum pads 28B. The central square is equivalent to the interchangeable cells 30 consisting of a small vacuum pad 28 and a pressure bag 29. In this case, the square make up tile is affixed to the vacuum pad 28 in the center in the manner above described and, after applying the adhesive, is placed in position by arm 2. This brings the eight large vacuum pads 28B into contact with the tiling already fitted and, when the vacuum is applied, strongback 14B is drawn towards the hull 35. Then the vacuum to small pad 28 is shut off and pressure is applied to bag 29 to bed the tile into the adhesive, with the eight vacuum pads 28B providing the reaction force. Clearly in this case additional valving would be required in addition to that shown in FIG. 4, to allow:

(a) vacuum to pad 28 only
(b) vacuum to pad 28 and all large pads 28B
(c) vacuum to all large pads 28B and pressure to bag 29.

Though FIG. 8 shows a square arrangement of pads 28B, other forms, e.g. cruciform, star or strip, etc. are equally possible. A further alternative is to use a new moon strongback 14 or a planar strongback with the valving modified so that only one cell 30 provides both vacuum and pressure, all other cells providing vacuum only.

If desired, the working platform 11 can be movably mounted on the hydraulic arm 2 in the vicinity of the manipulator 7 and provided with a degree of movement such that the full extent of the strongback 14 is accessible whereby an operator on the platform can accomplish all the tasks required concerning the strongback 14. In this case, second arm 3 is not needed.

Although hydraulic power is a convenient means of operating the arms 2 and 3, they can equally well be powered electrically or by pneumatic means.

Using the methods described hereinbefore, the whole of the surface of a right cylinder can be tiled efficiently. Also, the method can be adapted to tile spherical or tapered cylindrical sections. In these cases, the strongbacks would take the form of triangles or truncated triangles with the undersides curved in conformity with that of the sections to be tiled. The interchangeable bags 29 may be arranged in lines as on strongback 14 or in areas as on strongback 14B or in any suitable matrix to cover the area to which pressure is to be applied. Strongbacks could also be constructed for use with other than regularly curved surfaces.

Though other methods of tiling are known, the main advantages obtained in accordance with the present invention are:

(i) greatly increased speed of tiling (on an area covered basis);

(ii) greatly improved bonding;

(eater operator safety due to the absence of toxic vapors from epoxy resin adhesives compared to those emanating from impact adhesives;

(iv) greater tolerance of epoxy adhesives to changes in ambient conditions (e.g. temperature and humidity).

(v) Reduction in operator fatigue by substitution of mechanical handling/locational forces.

We claim:

1. An apparatus for applying a covering to a surface, said apparatus comprising:
    (i) a member having a surface essentially of the same profile and curvature as said surface to be covered;
    (ii) means to locate said covering adjacent to said surface of said member, prior to application of said covering to said surface to be covered;
    (iii) means to locate said member so that said covering, while adjacent to said surface of said member, is located in spaced relation to the surface to be covered with an adhesive interposed between the covering and the surface to be covered;
    (iv) means to removably secure said member to said surface to be covered, or to parts adjacent thereto; and
    (v) means to apply an essentially uniform pressure from said member, via said covering, onto said surface to be covered for a period of time long enough for said covering to become permanently bonded to said surface to be covered by means of said adhesive.

2. An apparatus as claimed in claim 1 wherein said means to locate the covering adjacent to the surface of the member is at least one partial vacuum applying means provided in the member and arranged to hold the covering fast to the member.

3. An apparatus as claimed in claim 1 wherein said means to apply an essentially uniform pressure is preferably air pressure acting through inflatable bags provided on the member.

4. An apparatus as claimed in claim 1 wherein said means to removably secure the member to the surface to be covered comprises a plurality of devices having screw threads for co-operation with corresponding screw threads on devices attached to said surface.

5. An apparatus as claimed in claim 1 and including a means to handle the member comprising:
    (i) a manipulator removably connected to said member and provided with sufficient degrees of freedom and motive power to move said member through appropriate angles and distances;

(ii) means of controlling the movement of said manipulator to position it accurately at a plurality of separate locations;

(iii) means of supplying any services required on said member to said member; and (iv) means to enable at least one operator to interface with said member and control the means to locate said covering against the surface to be covered and the means to apply uniform pressure from said member, via said covering, into said surface to be covered.

6. An apparatus as claimed in claim 5 wherein the means of controlling the movement of the manipulator and a means to support and move said operator in order to enable the operator to interface with said member at more than one location are located in juxtaposition.

7. An apparatus for applying a covering to a surface comprises:

(i) a support (ii) an articulated arm mounted for pivotal and rotational movement on the support and having a free end, (iii) a source of power for moving the arm, (iv) a manipulator movably mounted at the free end of the arm, (v) a source of power for moving the manipulator with respect to the arm, (vi) a strongback removably connected to said manipulator, (vii) vacuum applying means provided on said strongback operable to affix the covering to a surface of the strongback by suction, (viii) pressure applying means provided on said strongback to exert pressure on the covering affixed to the surface of the strongback and urge it against the surface to be covered so that that covering becomes affixed to the surface to be covered by adhesive provided between the covering and surface to be covered, and (ix) means of controlling the sources of power for moving the arm and manipulator, for controlling the vacuum applying means, and for controlling the pressure applying means.

8. An apparatus as claimed in claim 7 which includes a platform for an operator, said means of controlling the sources of power for the arm and the manipulator being controlled from said platform.

9. An apparatus as claimed in claim 8 wherein the support includes an articulated second arm mounted for pivotal and rotational movement and having the platform for the operator at its free end, said apparatus including a source of power for moving the second arm and a means of controlling the source of power for moving the second arm, said means of controlling the source of power for the second arm being controlled from said platform.

10. A method of applying a covering to a surface, said method comprising:

(a) collecting said covering from an adjacent location;

(b) placing said covering in spaced relation to the surface to be covered using a movable member to support and position accurately said covering;

(c) temporarily attaching said member to, said surface to be covered, or parts adjacent thereto;

(d) exerting a force on said covering via said member so as to urge the covering against said surface to be covered with adhesive interposed between the covering and the surface to be covered; and (e) subsequently removing said member for further use.

11. An apparatus as claimed in claim 7 wherein the strongback si removably connected to the manipulator by means of a ball and socket joint.

12. A method according to claim 10 wherein the surface to be covered is the curved external surface of a submarine and the covering is an acoustic tile, the method including the additional stop of providing mastic in any gaps between adjacent tiles covering said curved external surface.

* * * * *